(12) United States Patent
Gao

(10) Patent No.: US 11,263,580 B2
(45) Date of Patent: Mar. 1, 2022

(54) INFORMATION PUSH METHOD AND DEVICE

(71) Applicant: Beijing Jingdong Zhenshi Information Technology Co., Ltd., Beijing (CN)

(72) Inventor: Yaofei Gao, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 371 days.

(21) Appl. No.: 16/489,293

(22) PCT Filed: Jan. 11, 2018

(86) PCT No.: PCT/CN2018/072283
§ 371 (c)(1),
(2) Date: Aug. 27, 2019

(87) PCT Pub. No.: WO2018/176989
PCT Pub. Date: Oct. 4, 2018

(65) Prior Publication Data
US 2020/0126032 A1   Apr. 23, 2020

(30) Foreign Application Priority Data
Mar. 31, 2017 (CN) .......................... 201710206280.5

(51) Int. Cl.
*G06Q 10/08* (2012.01)
*G06K 7/14* (2006.01)
*G06K 19/06* (2006.01)

(52) U.S. Cl.
CPC ....... *G06Q 10/0833* (2013.01); *G06K 7/1417* (2013.01); *G06K 19/06037* (2013.01)

(58) Field of Classification Search
CPC ........... G06K 7/1417; G06K 19/06037; G06Q 10/0833
See application file for complete search history.

(56) References Cited

U.S. PATENT DOCUMENTS

2014/0288868 A1   9/2014  Gorham, Jr.
2016/0094671 A1   3/2016  Hirakata

FOREIGN PATENT DOCUMENTS

CN       203444521 U       2/2014
CN       103679423 A   *   3/2014
(Continued)

OTHER PUBLICATIONS

"Do you know what Yuantong's Mother's Post Station is", web page, <https://wenda.so.com/q/1515251943214523>, 3 pages, accessed on Feb. 26, 2021.
(Continued)

*Primary Examiner* — Laura A Gudorf
(74) *Attorney, Agent, or Firm* — Blank Rome LLP

(57) ABSTRACT

Disclosed are an information push method and device. One of the specific embodiments of the method comprises: extracting a user name and telephone number from order information submitted by a user; generating a confirmation page comprising a partial user name and partial telephone number of the order associated with the order information, wherein the partial user name is a user name in which some of the characters of the user name have been replaced by preset characters, and the partial telephone number is a telephone number in which some of the characters have been replaced by preset characters; using the link address of the user name, telephone number, and confirmation page and an order number pre-allocated to the order, generating a two-dimensional code of the order; in response to detecting a scan operation on the two-dimensional code by a distribution terminal, pushing the confirmation page to the distribution terminal.

20 Claims, 5 Drawing Sheets

(56) References Cited

FOREIGN PATENT DOCUMENTS

| | | | |
|---|---|---|---|
| CN | 104978644 | A | 10/2015 |
| CN | 105046794 | A | 11/2015 |
| CN | 105321054 | A | 2/2016 |
| CN | 105447674 | A | 3/2016 |
| CN | 105590184 | A | 5/2016 |
| CN | 105608545 | A | 5/2016 |
| CN | 105763513 | A | 7/2016 |
| JP | 2010250752 | A * | 11/2010 |
| WO | 2015145334 | A1 | 10/2015 |
| WO | 2018176989 | A1 | 10/2018 |

OTHER PUBLICATIONS

International Search Report re Application No. PCT/CN2018/072283 (WO 2018/176989 A1), dated Mar. 27, 2018.

* cited by examiner

INFORMATION PUSH METHOD AND DEVICE

CROSS-REFERENCE TO RELATED APPLICATIONS

This application is a national stage application filing of International Application No. PCT/CN2018/072283 filed on Jan. 11, 2018, which claims priority to Chinese Patent Application No. 201710206280.5, filed on Mar. 31, 2017, the contents of which are incorporated herein by reference in their entireties.

TECHNICAL FIELD

The present disclosure relates to the field of computer technology, specifically to the field of information processing technology, and more specifically to an information pushing method and apparatus.

BACKGROUND

With rapid development of the Internet economy, China has entered the era of on-line shopping. The rapid development of e-commerce has led to a sharp increase in demand for the express industry. Express signature is the last link of the entire Internet transaction, and it is the mission of each express company to securely deliver goods to customers. In fact, a lot of security problems exist in the process of express signature, such as loss of packages, falsely claim, leakage of user information and other vicious incidents. In the information age, user's personal information is a voucher for various on-line transactions, and once leaked, it may cause unexpected losses.

The existing approach of signing in the invisible express sheet is: part of the fields of the information such as user name, phone number, and address on the express sheet are hidden, and a deliveryman who delivers the express inputs the express number to a fixed application to obtain complete information such as user name, phone number, and address corresponding to the express, distributes based on the address, and contacts the customer based on the phone number. However, this approach brings a lot of trouble to the operation of the deliveryman, thereby decreasing the delivery efficiency. In addition, the deliveryman can still obtain personal information such as user's name and phone number.

SUMMARY

An objective of the present disclosure is to provide an improved information pushing method and apparatus to solve the technical problems mentioned in the Background part.

In a first aspect, embodiments of the present disclosure provide an information pushing method, including: extracting a user name and a phone number from order information submitted by a user; generating a confirmation page of an order including a partial user name and a partial phone number and associated with the order information, where the partial user name is a user name after part of characters in the user name are replaced with preset characters, and the partial phone number is a phone number after part of characters in the phone number are replaced with preset characters; generating a QR code of the order by using the user name, the phone number, a link address of the confirmation page, and an order number pre-assigned to the order; and pushing, in response to detecting a scan operation of a delivery terminal on the QR code, the confirmation page to the delivery terminal.

In some embodiments, the method further includes: extracting address information from the order information; identifying keywords existing in a preset keyword set from the address information, and generating a keyword subset; for each keyword in the keyword subset, acquiring information associated with the keyword from the address information, and inquiring a character corresponding to the information associated with the keyword in a preset address character table, where the preset address character table is used to characterize a corresponding relationship between information associated with keywords and characters; and constituting an address code of the address information by using the inquired each character.

In some embodiments, the method further includes: generating a first express page of the order, where the first express page includes at least one of: the order number, the bar code corresponding to the order number, the partial user name, the partial phone number, the address information, or the address code.

In some embodiments, after generating the QR code of the order, the method further includes: generating a second express page of the order, where the second express page includes at least one of: the order number, the bar code corresponding to the order number, or the QR code.

In some embodiments, the method further includes: in response to detecting the scan operation of the delivery terminal on the bar code corresponding to the order number, randomly generating a character string of preset digits; storing the character string, and sending the character string to a user terminal of the user.

In some embodiments, the method further includes: in response to receiving the character string submitted by the delivery terminal, determining whether the submitted character string matches the stored character string; and if matching, setting a delivery status of the order to be successful.

In some embodiments, the second express page further includes an identification code, where the identification code is part of characters in the phone number.

In a second aspect, the embodiments of the present disclosure provide an information pushing apparatus, including: a first extraction unit, configured to extract a user name and a phone number from order information submitted by a user; a first generation unit, configured to generate a confirmation page of an order including a partial user name and a partial phone number and associated with the order information, where the partial user name is a user name after part of characters in the user name are replaced with preset characters, and the partial phone number is a phone number after part of characters in the phone number are replaced with preset characters; a second generation unit, configured to generate a QR code of the order by using the user name, the phone number, a link address of the confirmation page, and an order number pre-assigned to the order; and a pushing unit, configured to push, in response to detecting a scan operation of a delivery terminal on the QR code, the confirmation page to the delivery terminal.

In some embodiments, the apparatus further includes: a second extraction unit, configured to extract address information from the order information; an identification unit, configured to identify keywords existing in a preset keyword set from the address information, and generate a keyword subset; an inquiry unit, configured to acquire, for each keyword in the keyword subset, information associated with the keyword from the address information, and inquire a character corresponding to the information associated with the keyword in a preset address character table, where the preset address character table is used to characterize a corresponding relationship between information associated with keywords and characters; and a constitution unit, configured to constitute an address code of the address information by using the inquired each character.

In some embodiments, the apparatus further includes: a third generation unit, configured to generate a first express page of the order, where the first express page includes at least one of: the order number, the bar code corresponding to the order number, the partial user name, the partial phone number, the address information, or the address code.

In some embodiments, the apparatus further includes: a fourth generation unit, configured to generate a second express page of the order, where the second express page includes at least one of: the order number, the bar code corresponding to the order number, or the QR code.

In some embodiments, the apparatus further includes: a fifth generation unit, configured to randomly generate a character string of preset digits, in response to detecting the scan operation of the delivery terminal on the bar code corresponding to the order number; and a storage unit, configured to store the character string, and send the character string to a user terminal of the user.

In some embodiments, the apparatus further includes: a determination unit, configured to determine, in response to receiving the character string submitted by the delivery terminal, whether the submitted character string matches the stored character string; and a setting unit, configured to set, if the submitted character string is determined to match the stored character string, a delivery status of the order to be successful.

In some embodiments, the second express page further includes an identification code, where the identification code is part of characters in the phone number.

In a third aspect, the embodiments of the present disclosure provide a server, including: one or more processors; and a storage device, configured to store one or more programs, wherein the one or more programs, when executed by the one or more processors, cause the one or more processors to implement the information pushing method provided by the present disclosure.

In a fourth aspect, the embodiments of the present disclosure provide a computer readable storage medium, storing a computer program thereon, wherein the computer program, when executed by a processor, implements the information pushing method provided by the present disclosure.

According to the information pushing method and apparatus provided by the present disclosure, part of characters in a user name and a phone number in order information submitted by a user are replaced; then a confirmation page of an order associated with the order information is generated by using a partial user name and a partial phone number after replacement; a QR code of the order is generated based on the user name, the phone number, a link address of the confirmation page, and an order number assigned to the order; and when it is detected that a delivery terminal scans the QR code, the confirmation page is pushed to the delivery terminal, so that personal information such as user name and phone number is hidden by using the QR code, and user's personal information is secured.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and features in the embodiments may be combined with each other without conflicts. The present disclosure will be described in detail with reference to the accompanying drawings and embodiments.

Figure 1:
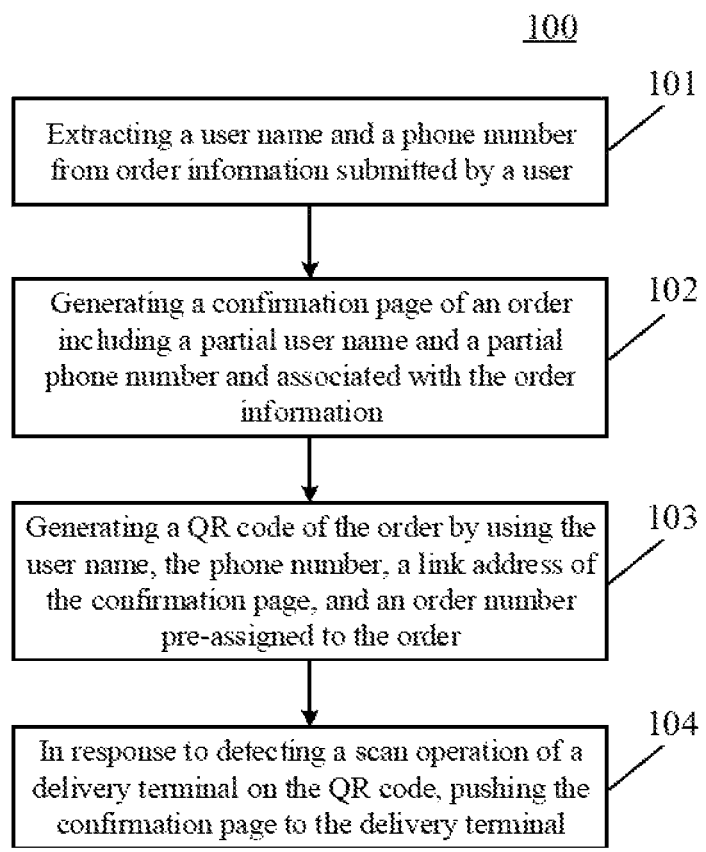
FIG. 1 is a flowchart of an embodiment of an information pushing method according to the present disclosure.

FIG. 1 shows a process 100 of an embodiment of an information pushing method according to the present disclosure. The information pushing method includes the following steps.

Step 101, a user name and a phone number are extracted from order information submitted by a user.

In this embodiment, an electronic device on which the information pushing method is performed may first receive order information submitted by a user, and then extract a user name and a phone number from the order information. The order information may further include name and quantity of a purchased product, address information, remark information, an order number assigned to the order associated with the order information, etc.

Step 102, a confirmation page of an order including a partial user name and a partial phone number and associated with the order information is generated.

In this embodiment, after the user name and the phone number are extracted in step 101, the electronic device may replace part of characters in the user name with preset characters to generate a partial user name, then replace part of characters in the phone number with preset characters to generate a partial phone number, and generate a confirmation page of an order including the partial user name and the partial phone number and associated with the order information. The confirmation page may also be referred to as a correct delivered page, indicating a page to be confirmed when a courier or a deliveryman arrives at a recipient address (an address indicated by the address information) in the order information, and delivers the article associated with the order to a recipient (a user indicated by the user name) in the order information.

The confirmation page displays the partial user name and the partial phone number. The confirmation page may also include a dial icon for calling a recipient, a pick-up code filling area, and a confirmation icon for confirming submission of a pick-up code. The deliveryman can call the recipient by clicking the partial user name or the dial icon. With this implementation, the deliveryman does not need to manually input the phone number for dialing, and the deliveryman cannot know the user's personal information, so that the user's personal information is secured while the delivery efficiency is improved. The pick-up code is a number that the recipient needs to provide to the deliveryman when signing for the express.

As an example, when the user name includes three characters, the middle character of the three characters may be replaced with a preset character; when the user name includes two characters, the second character of the two characters may be replaced with a preset character. For example, when the user name is "Zhang Xiao Ming" and the preset character is "*", the generated partial user name may be "Zhang*Ming". When the phone number is eleven characters, the fourth to seventh digits of the eleven characters may be replaced with preset characters. For example, when the phone number is "18812345678" and the preset characters are "#", the generated partial phone number may be "188####5678".

Step 103: a QR code of the order is generated using the user name, the phone number, a link address of the confirmation page, and an order number pre-assigned to the order.

In this embodiment, after the user name and the phone number are extracted in step 101 and the confirmation page is generated in step 102, the electronic device may take the user name, the phone number, a link address of the confirmation page, and an order number pre-assigned to the order as input information for generating a Quick Response Code (QR Code), and generate a QR code of the order by using a QR code generation algorithm. The link address of the confirmation page may be a website linked to the confirmation page. When receiving an order submitted by a user, the electronic device automatically assigns an order number to the received order, and the user may inquire the order information through the order number.

The QR code, also known as a 2-dimensional bar code, is a bar code represented by a specific black and white geometric figure distributed on a plane (in a 2-dimensional direction) according to a certain pattern for recording data symbols; the concept of "0" and "1" bit streams constituting the internal logic basis of a computer is skillfully used in code compilation, a plurality of geometric shapes corresponding to the binary system is used to represent literal numerical information, and the information is automatically read by an image input device or a photoelectric scanning device to implement automatic information processing. The QR code has some commonalities of bar code technologies: each code system has its own specific character set; each character occupies a certain width; the QR code has a certain check function, etc. At the same time, the QR code also has the functions of automatically identifying different lines of information, processing graphic rotation changes, etc.

In this embodiment, after the QR code is generated, the electronic device may output or present the QR code.

Step 104, in response to detecting a scan operation of a delivery terminal on the QR code, the confirmation page is pushed to the delivery terminal.

In this embodiment, when a scan operation of a delivery terminal on the QR code generated in step 103 is detected, the electronic device may inquire the confirmation page linked to the QR code based on the link address of the confirmation page inputted for generating the QR code, and push the inquired confirmation page to the delivery terminal.

The delivery terminal may be a terminal device used by the deliveryman in the delivery process. The delivery terminal generally includes an operating system, a memory, a graphics card, a CPU (Central Processing Unit), a screen and/or a keyboard, has certain data processing capability, supports wireless communication, is equipped with a battery or rechargeable, is mobile for use, and supports RFID (Radio Frequency Identification) read-write and bar code scanning, e.g., a hand-held terminal, a mobile phone, etc.

Figure 2:
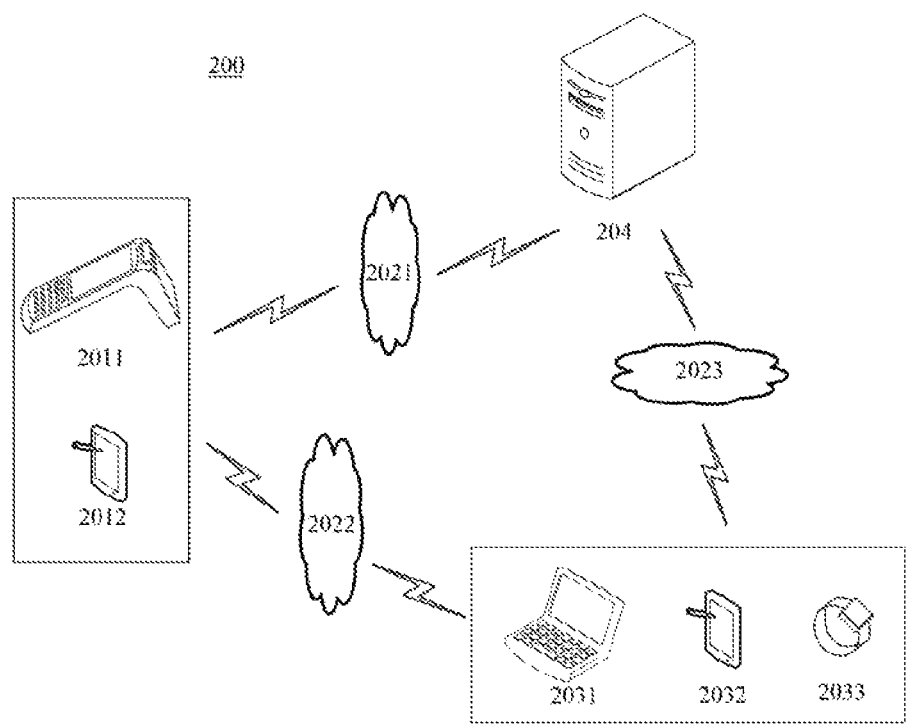
FIG. 2 is a diagram of an exemplary system architecture in which the present disclosure may be implemented.

In this embodiment, before the user name and the phone number in the order information submitted by the user are extracted, the order information submitted by the user through a user terminal needs to be received, and a diagram of an exemplary system architecture is shown in FIG. 2. As shown in FIG. 2, the system architecture 200 may include delivery terminals 2011, 2012, networks 2021, 2022, 2023, user terminals 2031, 2032, 2033, and a server 204. The network 2021 serves as a medium providing a communication link between the delivery terminal 2011, 2012 and the server 204; the network 2022 serves as a medium providing a communication link between the delivery terminal 2011, 2012 and the user terminal 2031, 2032, 2033; the network 2023 serves as a medium providing a communication link between the user terminal 2031, 2032, 2033 and the server 204. The networks 2021, 2022, 2023 may include various connection types, such as wired or wireless communication links or optical fibers.

The deliveryman or courier may use the delivery terminal 2011 or 2012 to interact with the server 204 via the network 2021, so that the server 204 pushes a confirmation page or the like to the delivery terminal 2011 or 2012. The deliveryman or courier may also use the delivery terminal 2011 or 2012 to interact with the user terminal 2031, 2032 or 2033 via the network 2022, so as to send a message or the like to the user terminal 2031, 2032 or 2033. The user may use the user terminal 2031, 2032 or 2033 to interact with the server 204 so as to receive the message or the like sent by the server. The user terminal 2031, 2032 or 2033 may be installed with various communication client applications, such as shopping applications, financial payment applications, instant messaging software, and logistics information query applications.

The delivery terminal 2011 or 2012 may be various electronic devices having a display screen, supporting information processing, supporting wireless communication and being mobile, including but not limited to a smart phone, a hand-held terminal, etc. The user terminal 2031, 2032 or 2033 may be various electronic devices having a display screen and supporting information processing, message transmission and reception, including but not limited to a smart phone, a tablet computer, a smart watch, a laptop computer, a desktop computer, etc.

The server 204 may be a server for providing various services, e.g., a backend order server for pushing a confirmation page to the delivery terminal 2011 or 2012. The backend order server may extract a user name and a phone number from order information submitted by the user terminal 2031, 2032 or 2033, generate a QR code of an order based on the user name, the phone number, an confirmation page of the order associated with the order information and an order number of the order, and then push the confirmation page to the delivery terminal 2011 or 2012 when detecting a scan operation on the QR code by the delivery terminal 2011 or 2012.

It should be noted that the information pushing method provided by the embodiments of the present disclosure is generally executed by the server 204, and accordingly, the information pushing apparatus is generally set in the server 204.

It should be appreciated that the numbers of the delivery terminals, the networks, the user terminals and the server in FIG. 2 are merely illustrative. Any number of delivery terminals, networks, user terminals and servers may be provided based on actual requirements.

Figure 3A:
FIG. 3A is a schematic diagram of a first express page of the information pushing method according to the present disclosure.

Further referring to FIG. 3A, a schematic diagram of a first express page of the information pushing method according to the present disclosure is shown. In FIG. 3A, the first express page includes an order number "1234567890123", a bar code 301 corresponding to the order number "1234567890123", a partial user name "Zhang*San", a partial phone number "188**1234", address information "Building A, Zhichun Road, Haidian District, Beijing", and an address code "12523" 302. When detecting a scan operation on the bar code 301 corresponding to the order number "1234567890123" by a delivery terminal, a backend order server may randomly generate a character string of preset digits, store the character string, and send the character string to a user terminal. The address code "12523" 302** is obtained by inputting the address information "Building A, Zhichun Road, Haidian District, Beijing" to a preset address code matching model for matching.

Figure 3B:
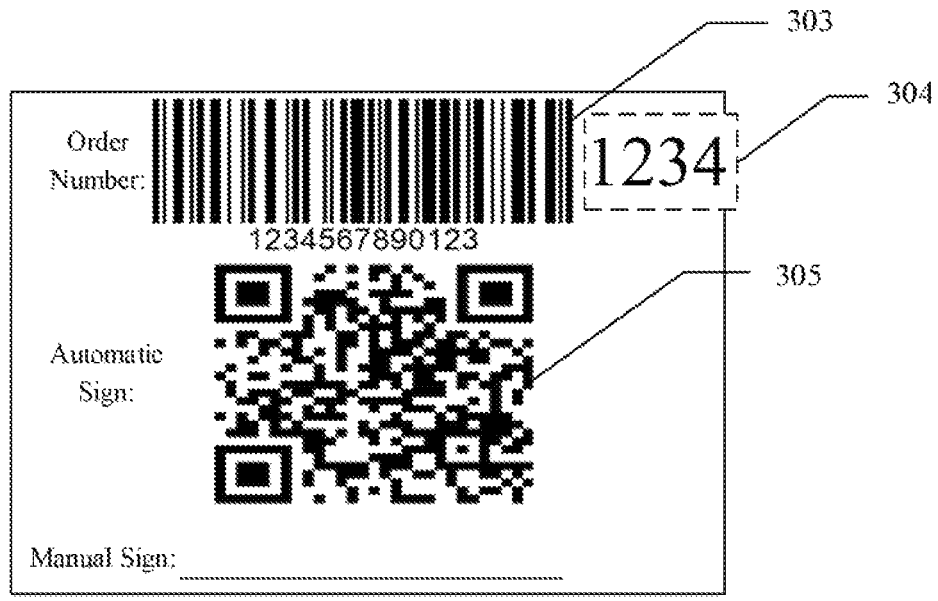
FIG. 3B is a schematic diagram of a second express page of the information pushing method according to the present disclosure.

Further referring to FIG. 3B, a schematic diagram of a second express page of the information pushing method according to the present disclosure is shown. In FIG. 3B, the second express page includes an order number "1234567890123", a bar code 303 corresponding to the order number "1234567890123", an identification code "1234" 304, a QR code 305, and a recipient's manual signing area. When detecting a scan operation on the bar code 302 corresponding to the order number "1234567890123" by a delivery terminal, a backend order server may randomly generate a character string of preset digits, store the character string, and send the character string to a user terminal. A deliveryman may quickly position an article corresponding to the order through the identification code "1234" 304. When detecting a scan operation on the QR code 305 by the delivery terminal, the backend order server may push a confirmation page to the delivery terminal.

Figure 3C:
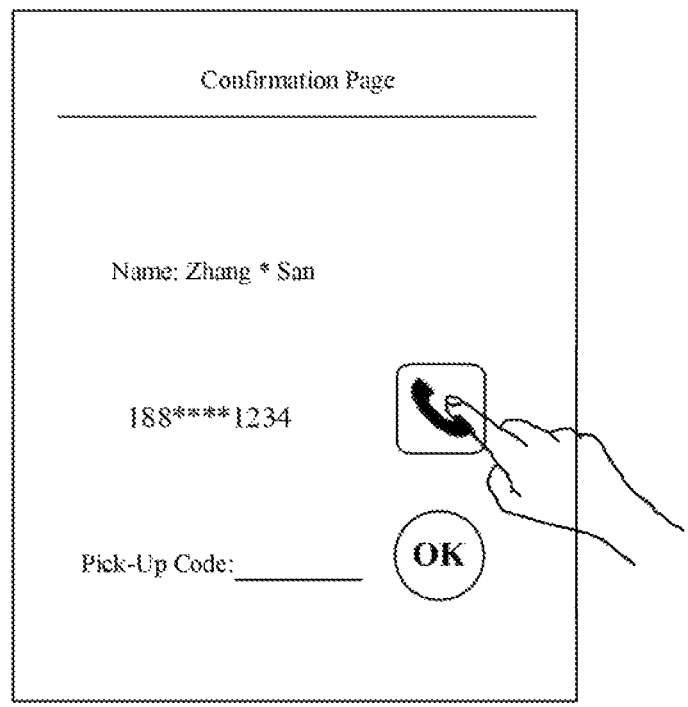
FIG. 3C is a schematic diagram of a confirmation page of the information pushing method according to the present disclosure.

Further referring to FIG. 3C, a schematic diagram of a confirmation page of the information pushing method according to the present disclosure is shown. In FIG. 3C, the confirmation page includes a partial user name "Zhang*San", a partial phone number "188****1234", a dial icon for calling a recipient, a pick-up code filling area, and a confirmation icon for confirming the submission of a pick-up code. A deliveryman may call the recipient by clicking the dial icon. The deliveryman may acquire the pick-up code received by the recipient from the recipient, then fill the pick-up code filling area with the pick-up code, and click the confirmation icon. After receiving a character string submitted by the delivery terminal, the backend order server may determine whether the submitted character string matches the stored character string, and set the delivery status of the order to be successful if matching.

Figure 4:
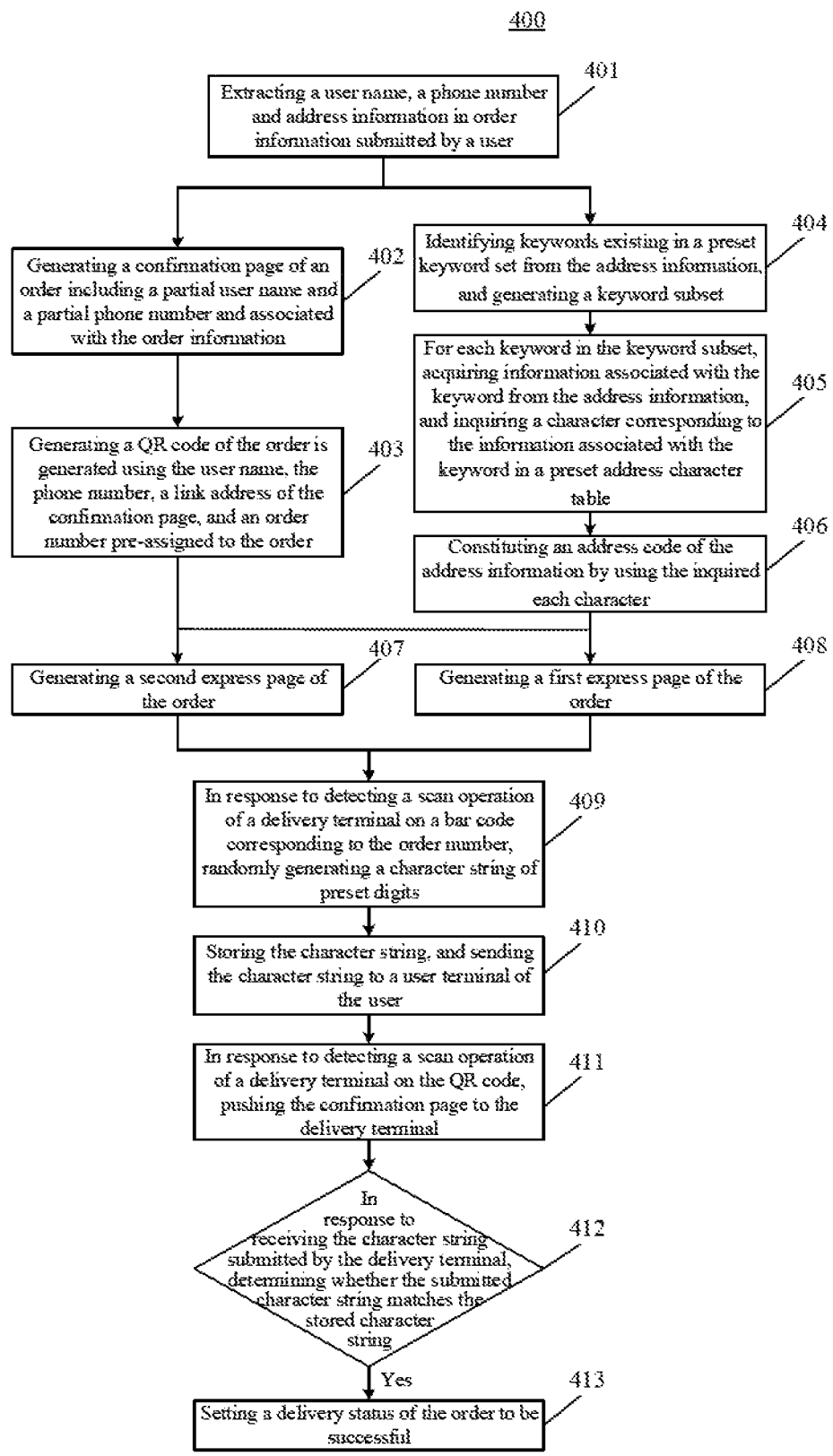
FIG. 4 is a flowchart of an embodiment of another information pushing method according to the present disclosure.

Further referring to FIG. 4, a process 400 of another embodiment of the information pushing method is shown. The process 400 of the information pushing method includes the following steps.

Step 401, a user name, a phone number and address information in order information submitted by a user are extracted.

In this embodiment, an electronic device on which the information pushing method is performed may first receive order information submitted by a user, and then extract a user name, a phone number and address information in the order information. The order information may further include name and quantity of a purchased product, remark information, an order number assigned to the order associated with the order information, etc.

Step 402, a confirmation page of an order including a partial user name and a partial phone number and associated with the order information is generated.

In this embodiment, after the user name and the phone number are extracted in step 401, the electronic device may replace part of characters in the user name with preset characters to generate a partial user name, then replace part of characters in the phone number with preset characters to generate a partial phone number, and generate a confirmation page of an order including the partial user name and the partial phone number and associated with the order information. The confirmation page may also be referred to as a correct delivered page, indicating a page to be confirmed when a courier or a deliveryman arrives at a recipient address in the order information, and delivers the article associated with the order to a recipient in the order information. The confirmation page may further include a pick-up code filling area and a confirmation icon for confirming the submission of a pick-up code.

Step 403, a QR code of the order is generated using the user name, the phone number, a link address of the confirmation page, and an order number pre-assigned to the order.

In this embodiment, after the user name and the phone number are extracted in step 401 and the confirmation page is generated in step 402, the electronic device may take the user name, the phone number, a link address of the confirmation page, and an order number pre-assigned to the order as input information for generating a QR code, and generate a QR code of the order by using a QR code generation algorithm. The link address of the confirmation page may be a website linked to the confirmation page. When receiving an order submitted by a user, the electronic device automatically assigns an order number to the received order, and the user may inquire the order information through the order number.

The QR code, also known as a 2-dimensional bar code, is a bar code represented by a specific black and white geometric figure distributed on a plane according to a certain pattern for recording data symbols; the concept of "0" and "1" bit streams constituting the internal logic basis of a computer is skillfully used in code compilation, a plurality of geometric shapes corresponding to the binary system is used to represent literal numerical information, and the information is automatically read by an image input device or a photoelectric scanning device to implement automatic information processing.

Step 404, keywords existing in a preset keyword set are identified from the address information, and a keyword subset is generated.

In this embodiment, the electronic device may identify keywords existing in a preset keyword set from the address information, and generate a keyword subset by using the identified keywords. The keywords in the keyword set may include "province", "city", "district", "county", "town", "village", "street", etc., for example, when the address information is "A province B city C county D town E street", the generated keyword subset is: "province", "city", "county", "town", and "street".

Step 405, for each keyword in the keyword subset, information associated with the keyword is acquired from the address information, and a character corresponding to the information associated with the keyword is inquired in a preset address character table.

In this embodiment, for each keyword in the keyword subset generated in step 404, the electronic device may acquire information associated with the keyword from the address information. For example, when the address information is "Zhongguancun Street, Haidian District, Beijing", the information associated with "District" is "Haidian District", and the information associated with "Street" is "Zhongguancun Street"; after that, a character corresponding to the information associated with the keyword may be found from a preset address character table. The address character table is used to characterize a corresponding relationship between information associated with keywords and characters.

Step 406, an address code of the address information is constituted using the inquired each character.

In this embodiment, the electronic device may constitute an address code of the address information by using the characters corresponding to the information associated with the respective keywords based on an order of the keywords in the address information. The address code is mainly used to facilitate an express sorting center to classify expresses based on a delivery area, that is, to deliver expresses of the same address code to the same area.

As an example, when the address information is "A province B city C county D town E street", the address information corresponding to "province" is "A province", the address information corresponding to "city" is "B city", the address information corresponding to "county" is "C county", the address information corresponding to "town" is "D town", and the address information corresponding to "street" is "E street". In an address character table, if "A province", "B city", "C county", "D town", and "E street" correspond to characters "1", "2", "4", "1", "2" respectively, then the address code of the address information "A province B city C county D town E street" is "12412".

It should be noted that an address code matching model may be generated in advance, and the electronic device may implement the technical features of step 404 to step 406 in this embodiment by using the address code matching model. The address code matching model is used to characterize a corresponding relationship between address information and address codes. The electronic device may input the address information to a preset address code matching model for matching to obtain an address code.

Step 407, a second express page of the order is generated.

In this embodiment, after the QR code of the order is generated in step 403, the electronic device may generate a second express page of the order. The express page is a page used by the express industry to record relevant information such as sender information, recipient information, and article information during article delivery. The second express page may include at least one of: the order number, the bar code corresponding to the order number, or the QR code.

In some optional implementations of this embodiment, the second express page may further include an identification code. The identification code may be part of characters in the phone number, for example, the last four digits of the phone number. The font, font size, or the like of the identification code may be processed, for example, the font of the identification code is bolded, and the font size is set to a preset font size. After the deliveryman inquires the part of characters in the recipient's phone number, he may quickly position the article corresponding to the order through the identification code on the second express page.

The second express page may also include a recipient's signing area. For the situation in which the delivery terminal cannot interact with the order server due to the network or other reasons, the deliveryman may adopt the conventional "manual signing" scheme to allow the recipient to sign on the second express page.

Step 408, a first express page of the order is generated.

In this embodiment, after the QR code of the order is generated in step 403 and the address code is obtained by matching in step 406, the electronic device may generate a first express page of the order. The first express page may include at least one of: the order number, the bar code corresponding to the order number, the partial user name, the partial phone number, the address information, or the address code.

In this embodiment, the express sorting center may scan the address code on the first express page by using an automatic sorting terminal, and automatically classify the article corresponding to the order based on the delivery area for delivering to a corresponding delivery station.

Step 409, in response to detecting a scan operation of a delivery terminal on a bar code corresponding to the order number, a character string of preset digits is randomly generated.

In this embodiment, when it is detected that the deliveryman uses the delivery terminal to scan the bar code corresponding to the order number in the second express page generated in step 407 or in the first express page generated in step 408, a character string of preset digits, e.g., six random digits, may be randomly generated, where the character string of preset digits is the above-mentioned pick-up code.

The delivery terminal may be a terminal device used by the deliveryman in the delivery process. The delivery terminal generally includes an operating system, a memory, a graphics card, a CPU, a screen and/or a keyboard, has certain data processing capability, supports wireless communication, is equipped with a battery, is mobile for use, and supports RFID read-write and bar code scanning, e.g., a hand-held terminal, a bar code scanner, a mobile phone, etc.

Step 410, the character string is stored and sent to a user terminal of the user.

In this embodiment, after the character string is generated in step 409, the electronic device may store the character string and send the character string to a user terminal of the user.

Step 411, in response to detecting a scan operation of a delivery terminal on the QR code, the confirmation page is pushed to the delivery terminal.

In this embodiment, the deliveryman delivers the article associated with the order based on the address information on the first express page, and scans the QR code on the second express page generated in step 407 after arriving at the address corresponding to the address information. When detecting a scan operation on the QR code in the second express page by the delivery terminal, the electronic device may inquire the confirmation page linked to the QR code based on the link address of the confirmation page inputting when generating the QR code, and push the inquired confirmation page to the delivery terminal.

The confirmation page displays the partial user name and the partial phone number. The confirmation page may also include a dial icon for calling a recipient, a pick-up code filling area, and a confirmation icon for confirming submission of a pick-up code. The deliveryman can call the recipient by clicking the partial user name or the dial icon. With this implementation, the deliveryman does not need to manually input the phone number for dialing, and the deliveryman cannot know the user's personal information, so that the user's personal information is secured while the delivery efficiency is improved.

Step 412, in response to receiving the character string submitted by the delivery terminal, whether the submitted character string matches the stored character string is determined.

In this embodiment, after positioning the article associated with the order of the recipient, the deliveryman may acquire the pick-up code received by the recipient from the recipient, then fill the pick-up code filling area of the confirmation page with the acquired pick-up code, and click the confirmation icon. After receiving the character string (the acquired pick-up code) submitted by the delivery terminal, the electronic device may determine whether the submitted character string matches the stored character string, that is, whether the submitted character string is the same as the stored character string, and if same, step 413 is executed.

Step 413, the delivery status of the order is set to be successful.

In this embodiment, when it is determined in step 412 that the submitted character string matches the stored character string, that is, the submitted character string is the same as the stored character string, the delivery status of the order may be set to be successful, and the deliveryman may hand over the article corresponding to the order to the recipient.

It may be seen from FIG. 4 that, compared with the embodiment corresponding to FIG. 1, the process 400 of the information pushing method in this embodiment highlights steps 409 and 410 of generating a character string of preset digits by detecting a scan operation on a bar code corresponding to the order number by a delivery terminal, and sending the character string to the user, and steps 412 and 413 of matching the character string submitted by the delivery terminal with the stored character string, and setting the delivery status of the order to be successful if matching. Therefore, the scheme described in this embodiment verifies the pick-up code to prevent the article corresponding to the order from being falsely claimed, and the order server may acquire the delivery status of the order in time.

Figure 5:
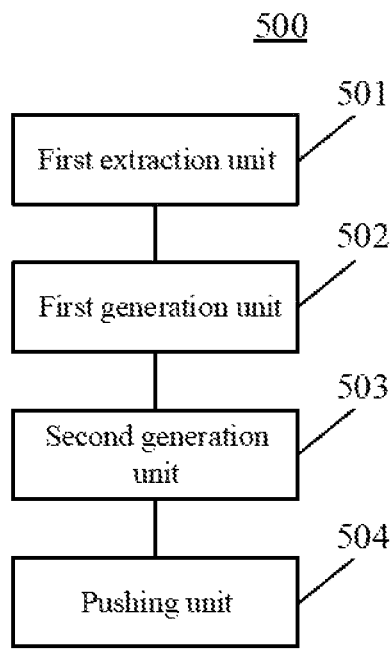
FIG. 5 is a schematic structural diagram of an embodiment of an information pushing apparatus according to the present disclosure.

Further referring to FIG. 5, as an implementation of the method shown in the above figures, the present disclosure provides an embodiment of an information pushing apparatus, the embodiment of the apparatus corresponds to the embodiment of the method shown in FIG. 1, and the apparatus may be applied to various electronic devices.

As shown in FIG. 5, the information pushing apparatus 500 of this embodiment includes a first extraction unit 501, a first generation unit 502, a second generation unit 503, and a pushing unit 504. The first extraction unit 501 is configured to extract a user name and a phone number from order information submitted by a user; the first generation unit 502 is configured to generate a confirmation page of an order including a partial user name and a partial phone number and associated with the order information, where the partial user name is a user name after part of characters in the user name are replaced with preset characters, and the partial phone number is a phone number after part of characters in the phone number are replaced with preset characters; the second generation unit 503 is configured to generate a QR code of the order by using the user name, the phone number, a link address of the confirmation page, and an order number pre-assigned to the order; and the pushing unit 504 is configured to push, in response to detecting a scan operation of a delivery terminal on the QR code, the confirmation page to the delivery terminal.

In this embodiment, the first extraction unit 501 of the information pushing apparatus 500 may first receive order information submitted by a user, and then extract a user name and a phone number from the order information, where the order information may further include name and quantity of a purchased product, address information, remark information, an order number assigned to the order associated with the order information, etc.

In this embodiment, after the first extraction unit 501 extracts the user name and the phone number, the first generation unit 502 may replace part of characters in the user name with preset characters to generate a partial user name, then replace part of characters in the phone number with preset characters to generate a partial phone number, and generate a confirmation page of an order including the partial user name and the partial phone number and associated with the order information. The confirmation page may also be referred to as a correct delivered page, indicating a page to be confirmed when a courier or a deliveryman arrives at a recipient address in the order information, and delivers the article associated with the order to a recipient in the order information.

In this embodiment, after the first extraction unit 501 extracts the user name and the phone number and the first generation unit 502 generates the confirmation page, the second generation unit 503 may take the user name, the phone number, a link address of the confirmation page, and an order number pre-assigned to the order as input information for generating a QR code, and generate a QR code of the order by using a QR code generation algorithm. The link address of the confirmation page may be a website linked to the confirmation page. When receiving an order submitted by a user, the electronic device automatically assigns an order number to the received order, and the user may inquire the order information through the order number.

In this embodiment, when a scan operation of a delivery terminal on the QR code generated by the second generation unit 503 is detected, the pushing unit 504 may inquire the confirmation page linked to the QR code based on the link address of the confirmation page inputted when generating the QR code, and push the inquired confirmation page to the delivery terminal.

In some optional implementations of this embodiment, the information pushing apparatus 500 may further include a second extraction unit (not shown), an identification unit (not shown), an inquiry unit (not shown), and a constitution unit (not shown). The second extraction unit may first receive order information submitted by a user, and then extract address information from the order information. After the second extraction unit extracts the address information, the identification unit may identify keywords existing in a preset keyword set from the address information, and generate a keyword subset by using the identified keywords. For each keyword in the keyword subset generated by the identification unit, the inquiry unit may acquire information associated with the keyword from the address information, and then find a character corresponding to the information associated with the keyword from a preset address character table, where the address character table is used to characterize a corresponding relationship between information associated with keywords and characters. The constitution unit may constitute an address code of the address information by using the characters corresponding to the information associated with the respective keywords based on an order of the keywords in the address information. The address code is mainly used to facilitate an express sorting center to classify expresses based on a delivery area, that is, to deliver expresses of the same address code to the same area.

In some optional implementations of this embodiment, the information pushing apparatus 500 may further include a third generation unit (not shown). After the second generation unit 503 generates the QR code of the order and the matching unit obtains the address code by matching, the third generation unit may generate a first express page of the order. The express page is a page used by the express industry to record relevant information such as sender information, recipient information, and article information during article delivery. The first express page may include at least one of: the order number, the bar code corresponding to the order number, the partial user name, the partial phone number, the address information, or the address code.

In some optional implementations of this embodiment, the information pushing apparatus 500 may further include a fourth generation unit (not shown). After the second generation unit 503 generates the QR code of the order, the fourth generation unit may generate a second express page of the order. The second express page may include at least one of: the order number, the bar code corresponding to the order number, or the QR code.

In some optional implementations of the embodiment, the information pushing apparatus 500 may further include a fifth generation unit (not shown) and a storage unit (not shown). When it is detected that the deliveryman uses the delivery terminal to scan the bar code corresponding to the order number in the second express page generated by the fourth generation unit or in the first express page generated by the third generation unit, the fifth generation unit may randomly generate a character string of preset digits. After the fifth generation unit generates the character string, the storage unit may store the character string and send the character string to the user terminal of the user.

In some optional implementations of this embodiment, the information pushing apparatus 500 may further include a determination unit (not shown) and a setting unit (not shown). After the character string submitted by the delivery terminal is received, the determination unit may determine whether the submitted character string matches the stored character string, that is, whether the submitted character string is the same as the stored character string, if the same, the setting unit may set the delivery status of the order to be successful, and the deliveryman may hand over the article corresponding to the order to the recipient.

In some optional implementations of this embodiment, the second express page may further include an identification code, where the identification code may be part of characters in the phone number, for example, the last four digits of the phone number. The font, font size, or the like of the identification code may be processed, for example, the font of the identification code is bolded, and the font size is set to a preset font size.

Figure 6:
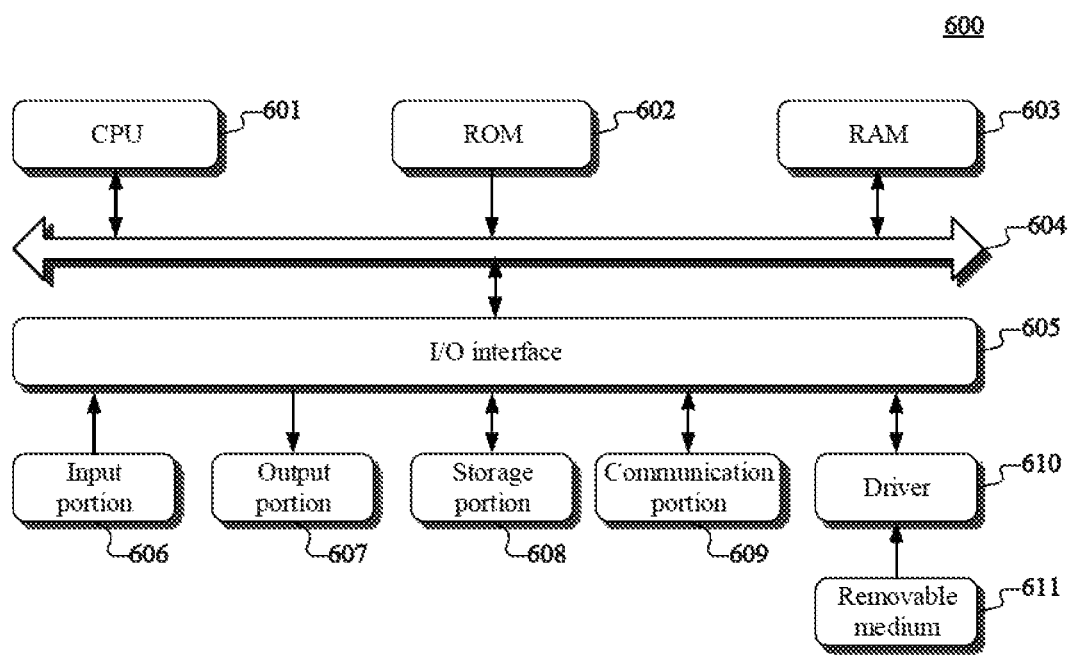
FIG. 6 is a schematic structural diagram of a computer system adapted to implement a server of the embodiments of the present disclosure.

Referring to FIG. 6, a schematic structural diagram of a computer system 600 adapted to implement a server of the embodiments of the present invention is shown. The server shown in FIG. 6 is merely an example, and should not limit the functions and scope of use of the embodiments of the present disclosure.

As shown in FIG. 6, the computer system 600 includes a central processing unit (CPU) 601, which may execute various appropriate actions and processes in accordance with a program stored in a read only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604

The following portions are connected to the I/O interface 605: an input portion 606 including a keyboard, a mouse, etc.; an output portion 607 including a cathode ray tube (CRT), a liquid crystal display (LCD), a loudspeaker, etc.; a storage portion 608 including a hard disk, etc.; and a communication portion 609 including a network interface card such as an LAN card and a modem. The communication portion 609 executes communication processing through a network such as Internet. A driver 610 is also connected to the I/O interface 1005 as needed. A removable medium 611, such as a magnetic disk, an optical disk, a magneto-optical disk or a semiconductor memory, is installed on the driver 610 as needed, so that a computer program read therefrom is installed in the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above functions as defined by the method of the present disclosure. It should be noted that the computer readable medium may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable storage medium may be any tangible medium containing or storing programs, which may be used by, or used in combination with, a command execution system, apparatus or element. In the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logical functions. It should be further noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, including a first extraction unit, a first generation unit, a second generation unit, and a pushing unit. The names of these units do not constitute a limitation to such units themselves in some cases. For example, the first extraction unit may also be described as "a unit for extracting a user name and a phone number from order information submitted by a user."

As another aspect, the present disclosure further provides a computer readable medium. The computer readable medium may be included in the apparatus described in the above embodiments, or a stand-alone computer readable medium without being assembled into the apparatus. The computer readable medium stores one or more programs, and when the one or more programs are executed by the apparatus, the apparatus is caused to: extract a user name and a phone number from order information submitted by a user; generate a confirmation page of an order including a partial user name and a partial phone number and associated with the order information, where the partial user name is a user name after part of characters in the user name are replaced with preset characters, and the partial phone number is a phone number after part of characters in the phone number are replaced with preset characters; generate a QR code of the order by using the user name, the phone number, a link address of the confirmation page, and an order number pre-assigned to the order; and push, in response to detecting a scan operation of a delivery terminal on the QR code, the confirmation page to the delivery terminal.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. An information pushing method, comprising:
   extracting a user name and a phone number from order information submitted by a user;
   generating a confirmation page of an order comprising a partial user name and a partial phone number and associated with the order information, the partial user name being a user name after part of characters in the user name are replaced with preset characters, and the partial phone number being a phone number after part of characters in the phone number are replaced with preset characters;
   generating a QR code of the order by using the user name, the phone number, a link address of the confirmation page, and an order number pre-assigned to the order; and
   pushing, in response to detecting a scan operation of a delivery terminal on the QR code, the confirmation page to the delivery terminal.

2. The method according to claim 1, further comprising:
   extracting address information from the order information;
   identifying keywords existing in a preset keyword set from the address information, and generating a keyword subset;
   for each keyword in the keyword subset, acquiring information associated with the keyword from the address information, and inquiring a character corresponding to the information associated with the keyword in a preset address character table, wherein the preset address character table is used to characterize a corresponding relationship between information associated with keywords and characters; and
   constituting an address code of the address information by using the inquired each character.

3. The method according to claim 2, further comprising:
   generating a first express page of the order, wherein the first express page comprises at least one of: the order number, the bar code corresponding to the order number, the partial user name, the partial phone number, the address information, or the address code.

4. The method according to claim 1, wherein after generating the QR code of the order, the method further comprises:
   generating a second express page of the order, wherein the second express page comprises at least one of: the order number, the bar code corresponding to the order number, or the QR code.

5. The method according to claim 3, further comprising:
   in response to detecting the scan operation of the delivery terminal on the bar code corresponding to the order number, randomly generating a character string of preset digits;
   storing the character string, and sending the character string to a user terminal of the user.

6. The method according to claim 5, further comprising:
in response to receiving the character string submitted by the delivery terminal, determining whether the submitted character string matches the stored character string; and
if matching, setting a delivery status of the order to be successful.

7. The method according to claim 4, wherein the second express page further comprises an identification code, wherein the identification code is part of characters in the phone number.

8. An information pushing apparatus, comprising:
at least one processor; and
a memory storing instructions, the instructions when executed by the at least one processor, cause the at least one processor to perform operations, the operations comprising:
extracting a user name and a phone number from order information submitted by a user;
generating a confirmation page of an order comprising a partial user name and a partial phone number and associated with the order information, the partial user name being a user name after part of characters in the user name are replaced with preset characters, and the partial phone number being a phone number after part of characters in the phone number are replaced with preset characters;
generating a QR code of the order by using the user name, the phone number, a link address of the confirmation page, and an order number pre-assigned to the order; and
pushing in response to detecting a scan operation of a delivery terminal on the QR code, the confirmation page to the delivery terminal.

9. The apparatus according to claim 8, the operations further comprising:
extracting address information from the order information;
identifying keywords existing in a preset keyword set from the address information, and generate a keyword subset;
acquiring, for each keyword in the keyword subset, information associated with the keyword from the address information, and inquire a character corresponding to the information associated with the keyword in a preset address character table, wherein the preset address character table is used to characterize a corresponding relationship between information associated with keywords and characters; and
constituting an address code of the address information by using the inquired each character.

10. The apparatus according to claim 9, the operations further comprising:
a third generation unit, configured to generate generating a first express page of the order, wherein the first express page comprises at least one of: the order number, the bar code corresponding to the order number, the partial user name, the partial phone number, the address information, or the address code.

11. The apparatus according to claim 8, the operations further comprising:
generating a second express page of the order, wherein the second express page comprises at least one of: the order number, the bar code corresponding to the order number, or the QR code.

12. The apparatus according to claim 10, the operations further comprising:
randomly generate a character string of preset digits, in response to detecting the scan operation of the delivery terminal on the bar code corresponding to the order number; and
storing the character string, and send the character string to a user terminal of the user.

13. The apparatus according to claim 12, the operations further comprising:
determining, in response to receiving the character string submitted by the delivery terminal, whether the submitted character string matches the stored character string; and
setting, if the submitted character string is determined to match the stored character string, a delivery status of the order to be successful.

14. The apparatus according to claim 11, wherein the second express page further comprises an identification code, wherein the identification code is part of characters in the phone number.

15. A non-transitory computer readable storage medium, storing a computer program thereon, wherein the computer program, when executed by a processor, causes the processor to perform operations, the operations comprising:
extracting a user name and a phone number from order information submitted by a user;
generating a confirmation page of an order comprising a partial user name and a partial phone number and associated with the order information, the partial user name being a user name after part of characters in the user name are replaced with preset characters, and the partial phone number being a phone number after part of characters in the phone number are replaced with preset characters;
generating a QR code of the order by using the user name, the phone number, a link address of the confirmation page, and an order number pre-assigned to the order; and
pushing, in response to detecting a scan operation of a delivery terminal on the QR code, the confirmation page to the delivery terminal.

16. The computer readable storage medium according to claim 15, the operations further comprising:
extracting address information from the order information;
identifying keywords existing in a preset keyword set from the address information, and generating a keyword subset;
for each keyword in the keyword subset, acquiring information associated with the keyword from the address information, and inquiring a character corresponding to the information associated with the keyword in a preset address character table, wherein the preset address character table is used to characterize a corresponding relationship between information associated with keywords and characters; and
constituting an address code of the address information by using the inquired each character.

17. The computer readable storage medium according to claim 16, the operations further comprising:
generating a first express page of the order, wherein the first express page comprises at least one of: the order number, the bar code corresponding to the order number, the partial user name, the partial phone number, the address information, or the address code.

18. The computer readable storage medium according to claim 15, wherein after generating the QR code of the order, the operations further comprise:

generating a second express page of the order, wherein the second express page comprises at least one of: the order number, the bar code corresponding to the order number, or the QR code.

19. The computer readable storage medium according to claim 17, the operations further comprising:
in response to detecting the scan operation of the delivery terminal on the bar code corresponding to the order number, randomly generating a character string of preset digits;
storing the character string, and sending the character string to a user terminal of the user.

20. The computer readable storage medium according to claim 19, the operations further comprising:
in response to receiving the character string submitted by the delivery terminal, determining whether the submitted character string matches the stored character string; and
if matching, setting a delivery status of the order to be successful.

\* \* \* \* \*